United States Patent Office 3,158,074
Patented Nov. 24, 1964

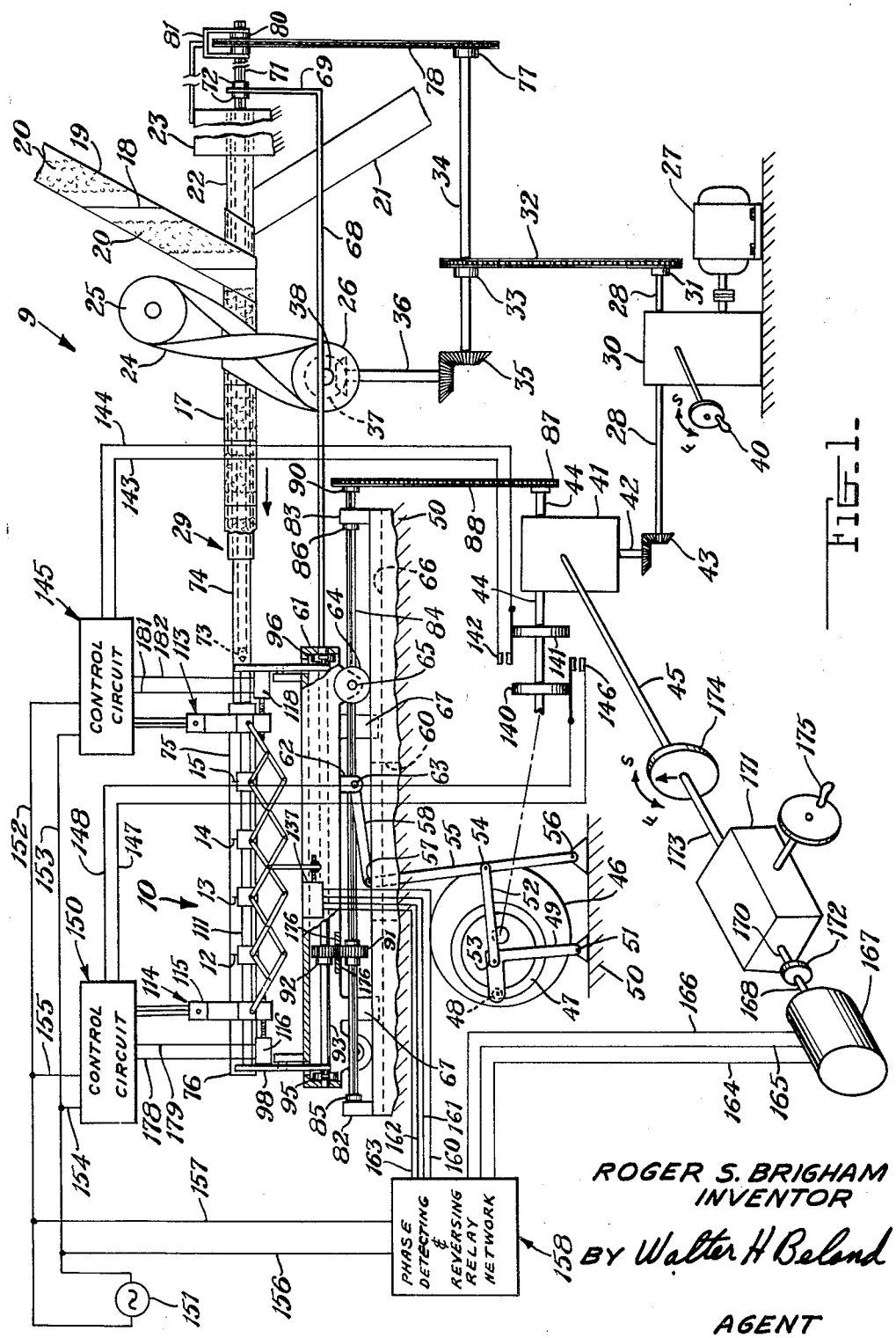

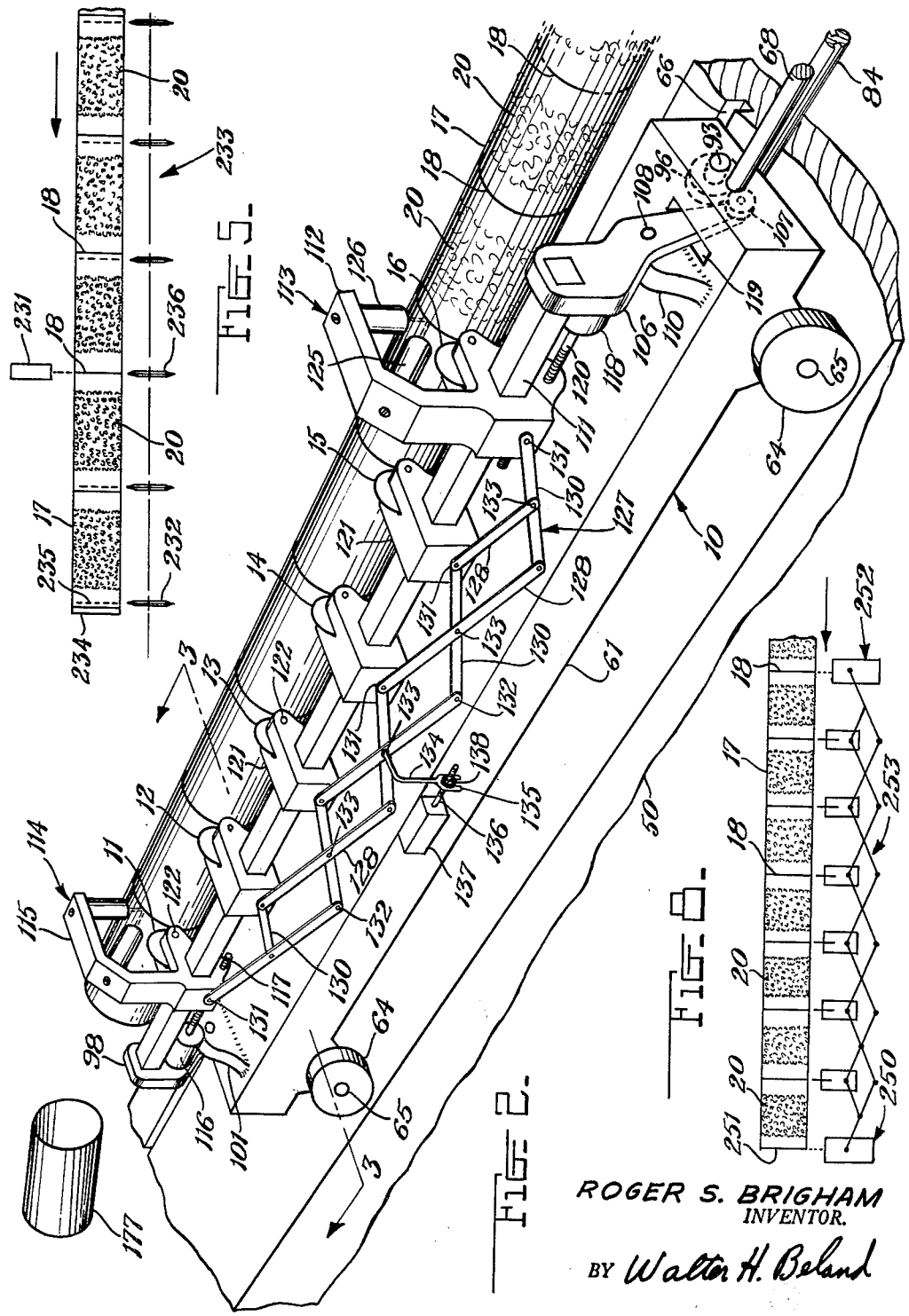

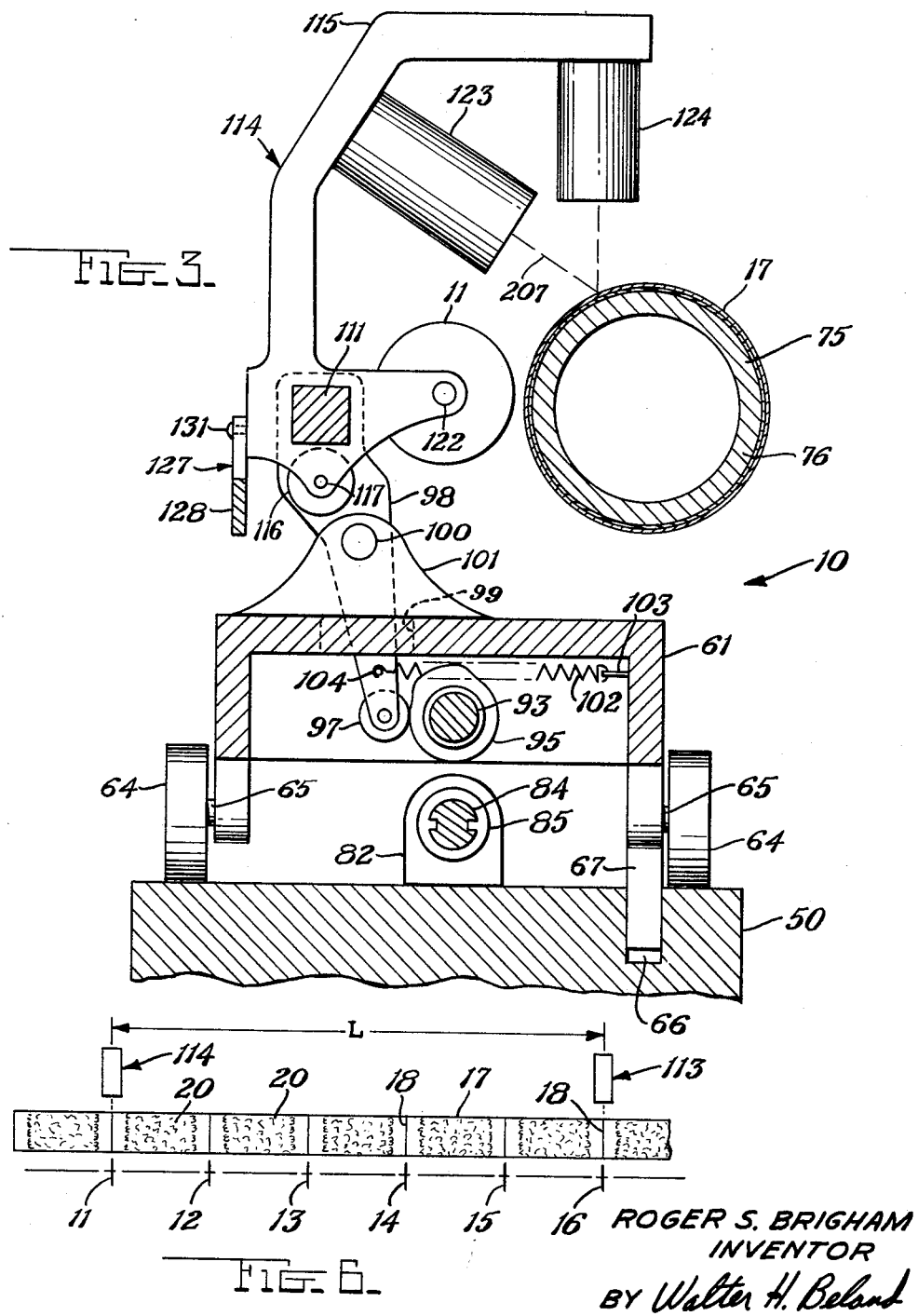

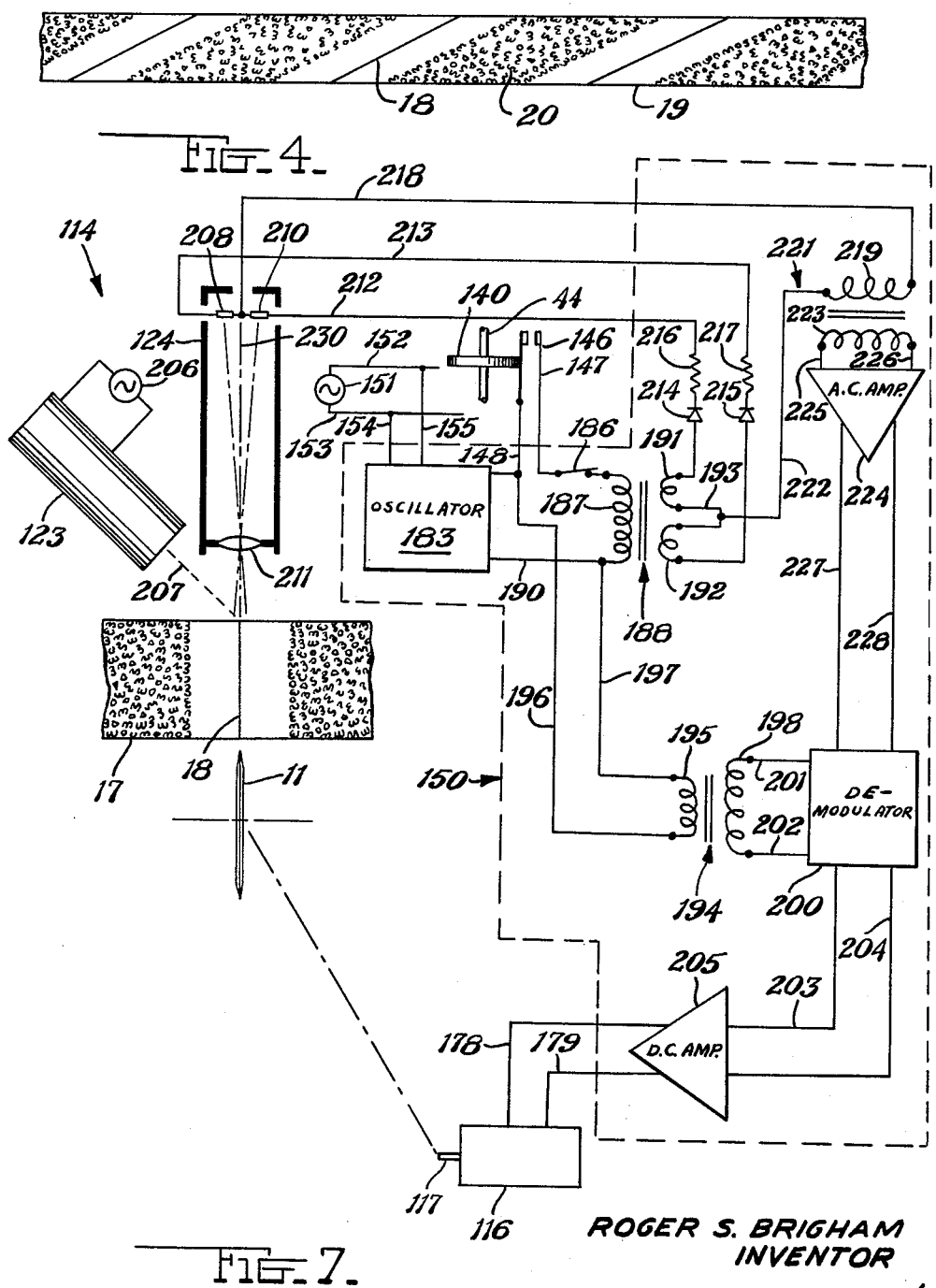

3,158,074
METHOD AND APPARATUS FOR MANUFACTURING SPIRALLY WOUND CONTAINERS WITHOUT TRIM LOSS
Roger S. Brigham, Crete, Ill., assignor to Continental Can Company, Inc., New York, N.Y., a corporation of New York
Filed Mar. 28, 1963, Ser. No. 268,705
7 Claims. (Cl. 93—80)

My invention relates to the art of manufacturing round tubular containers for such products as food, automobile engine oil, household cleansers and the like. More specifically my invention relates to the manufacture of such containers from multiple plies of strip material that are spirally wound on a mandrel and adhesively bonded together to produce a tube which is cut up into individual container lengths or bodies; which usually, but not necessarily, will have metal covers double-seamed on to the ends thereof in the same manner that the covers are double-seamed on to the ends of tin cans.

This method of making containers and machinery for making the containers is well-known, having been used commercially for at least thirty years. Up until recent years, it was the practice that the strip forming the outer layer of the spirally wound containers was a plain strip not decorated in any manner or having any printed information thereon. After the filling and closing of such containers a rectangular paper label was wrapped around each container and adhesively applied thereto as is the usual practice today of applying such labels to tin cans.

In recent years, a new technique of manufacturing such containers has been resorted to in which the strip forming the outer layer of the containers has repetitive label patterns printed thereon such that each container cut from the wound tube will already be labeled.

In using this new technique, it is necessary that the being wound tube be accurately cut with respect to the positions of the individual labels thereon so that the labels will be properly centered on the individual containers. If the being wound tube is not cut within the allowable tolerance for label misalignment the result will be that at least one container body will be destroyed if a single cutter is being used to cut off a long piece of tube from which individual container bodies will subsequently be cut by a gang cutter, or, perhaps a half dozen container bodies may be destroyed if a gang type cutter is being employed to simultaneously cut the being wound tube into container lengths. It is now a well-known expedient in the manufacture of such containers to provide what is known as "planned trim" in the being wound tube which provides a tolerance limit within which normal cutting errors that can be expected will not result in the ruining of any of the cut container lengths. The difficulty with, or objection to, the use of planned trim which it is the main object of my invention to overcome, is that in order to prevent the destruction of whole container bodies a sacrifice of planned trim material is made during each cutting operation which results in the waste of a considerable amount of material when billions of containers are being manufactured yearly.

In my co-pending application Serial No. 212,018, filed on July 24, 1962, and entitled "Apparatus for Manufacturing Spirally Wound Containers," is disclosed an apparatus which increases the accuracy of cutting the being wound tube to an extent making it possible to substantially cut down on the amount of planned trim waste material necessary in a manufacturing operation. The object of the present invention in the broad sense is to entirely eliminate the need for providing excess trim material in the being wound tube and by so doing achieve a considerable saving in material when manufacturing containers in large volume.

An important advantage of the invention is that it is capable of being integrated into commercially available types of spiral winding machines with a minimum of redesign and construction being necessary.

Still another advantage of my invention is that it provides gang cutters; the spacing of which may be minutely adjusted during operation so as to permit the successful manufacture of a plurality of cut container lengths for each reciprocation of the cutter carriage and without the usual associated trim loss.

My invention will best be understood by referring to the following description and drawings in which:

FIG. 1 is a somewhat schematic representation of a well-known type of spiral winding machine shown for the most part in side elevation with certain of the parts being in section and having incorporated therein the features of the present invention;

FIG. 2 is a perspective view of the cutter carrying carriage of the spiral winding machine as redesigned and reconstructed in accordance with the invention;

FIG. 3 is a section view in elevation through the cutter carrying carriage taken along line 3—3 of FIG. 2;

FIG. 4 is a view showing in the flat a length of strip material having repeat patterns printed thereon, which, when spirally wound, forms the outer layer of the containers;

FIG. 5 is a view of a length of wound tube having a plurality of repeat patterns thereon in position for being cut up into individual container lengths by a gang type cutter, said tube having incorporated therein parceled out planned trim in accordance with prior art practice;

FIG. 6 shows a length of spirally wound tube having a plurality of repeat patterns thereon in proper position to be cut by ganged cutters; said tube, in accordance with the present invention, not having parceled out planned trim waste material distributed among the patterns thereon;

FIG. 7 is a schematic showing of the electrical control system used for accurately positioning the cutters relative to the being wound tube; and FIG. 8 is a view of a length of wound tube having a plurality of repeat patterns thereon in proper position to be cut by ganged cutters; said tube having invisible magnetic registration lines printed thereon.

Referring to FIGURES 1 and 2 of the drawings in particular, it will be seen that the spiral winding machine generally indicated at 9 is provided with a carriage indicated generally at 10 for carrying a plurality of cutters 11, 12, 13, 14, 15 and 16 which are used to sever the being wound tube 17 along substantially equally spaced circumferential lines 18 that are pre-applied on the outer cover forming strip 19. Also pre-applied on strip 19 between the lines 18 are repetitive labels or decorative patterns 20. In accordance with usual practice a strip 21 forming the inner tube wall is spirally wound on a fixed mandrel portion 22 of a mandrel generally 29 with the edges of the convolutions of the spiral formed being in abutting relationship. The cover forming strip 19 is wound on top of the strip 21 with the edges of this strip being out of register with the edges of strip 21 and in slightly overlapped relationship. The under-surface of the strip 19 is provided with an adhesive that holds the resultant wound tube 17 together. The right end of the mandrel portion 22 is suitably mounted in a stationary frame member of the machine indicated at 23. A crossed belt 24 entrained around pulleys 25 and 26 turns the being wound tube 17 on the mandrel portion 22 and advances it forwardly along the mandrel portion 22 to the left. The belt 24 is driven by motor 27 through a power train comprising the output shaft 28 of a P.I.V. (positive infinitely variable) drive unit 30, sprocket 31, chain 32, sprocket 33, shaft 34, miter gears 35, shaft 36 and miter gears 37 which drive the shaft 38 on which the pulley 26 is mounted. The speed of the P.I.V. output shaft 28, and hence the speed of the belt 24, may be adjusted as desired by moving the speed adjustment handle 40 of the P.I.V. unit 30 in the desired direction.

A second P.I.V. unit 41 has an input shaft 42 which is driven by a set of miter gears 43 by the output shaft 28 of the P.I.V. drive 30. P.I.V. drive 41 has an output shaft 44 the speed of which may be adjusted by rotating the P.I.V. adjusting shaft 45 to a new adjusted position as desired. Mounted on the output shaft 44 for rotation therewith is a cam 46. Cam 46 has a cam track 47 in which rides a cam follower 48. Cam follower 48 is mounted on one leg of an L-shaped member 49. The lower extremity of the other leg of member 49 is pivotally connected to a fixed frame member 50 at 51. A connecting bar 52 is pivoted at one end thereof to the member 49 at 53; the other end thereof being pivoted at 54 to a generally vertically disposed lever arm 55. The lower end of the lever arm 55 is pivotally connected to the stationary frame 50 at 56, while the upper end is pivotally connected at 57 to a generally horizontal connecting bar 58. A slot 60 is provided in the frame 50 for the movement of the arm 55 therein. The carriage 10 is provided with a frame 61 which has depending therefrom an extension 62 to which the other end of connecting bar 58 is pivotally connected by means of a pin 63.

Pivot points 51, 53, 54 and 56 form the corners of a parallelogram linkage through which back and forth motion is provided to the carriage 10 parallel to the mandrel 29 and being wound tube 17. The carriage 10 rolls back and forth on four rollers 64 carried on the stub shafts 65 which are mounted in the frame 61. In order to guide the carriage 10 a slot 66 is provided in the frame 50. A pair of tongues 67 depending from the carriage frame 61 slidingly fit into the slot 66.

The cam track 47 is cut so that the carriage will move at a constant speed while it is moving to the left in the direction that the being wound tube 17 is moving. It is to be understood, of course, that there will be an acceleration of the carriage at the beginning of its movement from right to left until the desired constant speed has been attained and then there will be a deceleration of the carriage near the end of the movement to the left prior to the return stroke of the carriage to the right. With this arrangement, the speed of the being wound tube 17 to the left and the speed of the carriage 10 during its leftward stroke can be adjusted to be substantially equal by varying the speed of the P.I.V. output shaft 44.

Attached at one end of the carriage frame 61 is a long arm 68 having its opposite end bent at right angles thereto as at 69. The end 69 is bored to loosely fit around a splined shaft 71. A pair of collars 72 mounted on the shaft 71 maintain the end 69 of the arm 68 in fixed longitudinal position on the shaft 71. Shaft 71 passes through the mandrel portion 22 and the left end thereof is provided with threads and is threaded into a threaded bore 73 which is is provided in the right end portion 74 of a movable portion 75 of the mandrel 29. The right end portion 74 of the movable mandrel portion 75 is smaller in diameter than the left end portion which is indicated at 76. The smaller diameter of the end 74 allows it to be slidably fitted into the fixed mandrel portion 22 which is tubular. Due to the connection of the arm 68 to the carriage 10 and to the shaft 71, the mandrel portion 75 is caused to move longitudinally back and forth with the carriage 10.

The left end portion 76 of the mandrel portion 75 forms a back up anvil for the cutters 11, 12, 13, 14, 15 and 16. The mandrel portion 75 is also caused to rotate in timed relation with the winding belt 24 by means of a sprocket 77 mounted on the shaft 34, a chain 78 and a sprocket 80, mounted on the splined shaft 71. A suitable retainer 81 mounted on the frame 23 retains the sprocket 80 against longitudinal movement with the shaft 71 as the shaft reciprocates with the carriage 10.

Journaled in bearing blocks 82 and 83 mounted on the frame 50 is a splined shaft 84. Shaft 84 is prevented from shifting longitudinally in the bearing blocks 82 and 83 by means of collars 85 and 86. Shaft 84 is caused to rotate by means of sprocket 87 mounted on the output shaft 44 of the P.I.V. drive unit 41, chain 88, and the sprocket 90, which is mounted on the right end of shaft 84. A gear 91 is slidably mounted on the shaft 84 and engages with the splines thereof so as to rotate with the shaft 84. Gear 91 meshes with, in driving relationship, a gear 92. Gear 92 is fixedly mounted on a shaft 93 which is rotatably journaled in the carriage frame 61 at its ends. Mounted on the shaft 93 near the ends thereof are cams 95 and 96. The cam 95 which is adjacent the left end of the shaft 93 as shown in FIG. 1 has associated therewith a cam follower 97 (FIG. 3) which is mounted on the lower end of an arm 98. The arm 98 has a pin 100 fixed thereto which is rotatably journaled in a bearing bracket portion 101 of the frame 61. A spring 102 is suitably attached at one end as at 103 to the frame 61 and at its other end to the arm 98 as at 104. Spring 102 urges the cam follower 97 against the cam 95. An arm 106 which is similar to the arm 98 is positioned adjacent the right end of the shaft 93 as best shown in FIG. 2. The lower end of the arm 106 has mounted thereon a cam follower 107 which rides against the cam 96. A spring (not shown) similar to the spring 102 urges the cam follower 107 into engagement with the cam 96. A pin 108 extending out of the arm 106 and fixed thereto is rotatably journaled in a bracket 110 which is similar to the bracket 101. A bar 111 has its ends fixedly attached in the upper ends of the arms 98 and 106. Slidably mounted on the bar 111 is a frame 112 of an observing unit generally indicated at 113. The observing unit 113 is located adjacent the arm 106. A similar observing unit 114 having a frame 115 which is slidably mounted on the bar 111 is located adjacent the arm 98. As best observed in FIGURES 2 and 3, the arms 98 and 106 respectively extend through openings 99 and 119 in the frame 61.

Arm 98 has fixedly mounted thereon under the bar 111 a servo motor 116. Servo motor 116 has a threaded output shaft 117 which extends through a threaded bore in the frame 115. A like servo motor 118 is fixedly attached to the arm 106 beneath the bar 111. Servo motor 118 has an output shaft 120 which is threadedly received in a threaded bore in the frame 112. A plurality of cutter supporting slide blocks 121 carry the rotatable cutting knives 12, 13, 14 and 15. The cutting knives 11 and 16 are carried by the frames 115 and 112 respectively. All of the cutters are rotatably mounted on pins 122.

Suitably attached to the frame 115 as best shown in FIGURE 3 is a light source 123. Also suitably attached to the frame 115 adjacent the light source 123 is a photo-sensitive cell housing 124. A similar light source 125 is mounted on the frame 112. A photo-sensitive cell housing 126 similar to the housing 124 is suitably fastened to the frame 112 adjacent the light source 125.

A lazy tongs type of proportional spacing linkage generally indicated at 127 connects the blocks 121 with the frames 112 and 115. The proportional spacing linkage 127 includes a plurality of parallel links 128 and a plurality of parallel links 130. The links 128 and 130 are pinned to the slide blocks 121 and the frames 112 and 115 for pivotal movement at 131. Directly below the connections 131 with the slide blocks 121 the links 128 and 130 are pivotally pinned together as indicated at 132. Longitudinally intermediate the connections 131 and 132 the links 128 and 130 are pivotally pinned together as indicated at 133. An L-shaped arm which is bifurcated at its lower end and which is indicated at 134 is attached to the lazy tongs proportional spacing linkage 127 at the pivotal connection 133 which is located intermediate the two innermost slide blocks 121 at the geometric center of the lazy tongs linkage. The bifurcated end of the arm 134 which is indicated at 135 fits over a threaded operating rod 136 of a linear variable differential transformer 137. Retaining nuts 138 on the operating rod are disposed on opposite sides of the bifurcated end 135 so that any back and forth movement of the arm 134 will result in the same amount of back and forth movement of the operating rod 136. The nuts 138 are not tight against the bifurcated end 135 so as to permit the bifurcated end 135 to move slightly vertically up and down with respect to the operating rod 136 during the operation of the apparatus.

The output shaft 44 of the P.I.V. drive unit 41 has two cams 140 and 141 mounted thereon for rotation therewith. Associated with the cam 141 is a set of contacts 142 which are caused to be operated once for every rotation of the cam 141. A pair of wires 143 and 144 connect the contacts 142 to a control circuit generally indicated at 145.

The cam 140 is operatively associated with a set of contacts 146 in the same way. The contacts 146 are connected by means of wires 147 and 148 to a control circuit generally indicated at 150.

The control circuit 145 is energized by an A.C. generator indicated at 151 via wires 152 and 153. The control circuit 150 is also energized by the generator 151 via the wires 152 and 153 and connecting wires 154 and 155. A phase detecting and reversing relay network is also energized by the generator 151 via the wires 152, 153 and connecting wires 156 and 157. The phase detecting and reversing relay network is indicated generally at 158. Wires 160, 161, 162 and 163 connect the linear variable differential transformer 137 into the phase detecting and reversing relay network 158. Wires 164, 165 and 166 conect a reversible electric motor 167 into the phase detecting and reversing relay network 158. The motor 167 has an output shaft 168 which is coupled to an input shaft 170 of a reduction gear box 171 by means of a flexible coupling 172. The reduction gear box 171 has an output shaft 173 which is connected to the speed adjusting shaft 45 of the P.I.V. unit 41 by means of a coupling 174. The gear reduction box 171 is also provided with a differential adjustment which is operated by the handle 175; the operation of which results in the rotation of the shaft 173 independently of the operation of input shaft 170 which normally causes the shaft 173 to be rotated at a proportional reduced speed with respect thereto. It is thus possible to adjust the speed of the output shaft 44 by repositioning the handle 175.

In the operation of the spiral winding machine 9 it is to be understood that the sprockets 87 and 90 and the gears 91 and 92 are sized to cause the cams 95 and 96 to make one complete revolution for each complete back and forth movement of the carriage 10 on the frame 50. A pair of retaining bars 176 mounted on the frame 61 cause the gear 91 to slide back and forth on the shaft 84 and operate to maintain the gears 91 and 92 in mesh. As best shown in FIGURE 3, each rotation of the cam 95 will result in the movement of the arm 98 in a clockwise direction; the arm 106 is likewise caused to be moved in a clockwise direction as viewed in FIGURE 2 by means of the cam 96. When the high points of these cams are moved into engagement with the respective cam followers 97 and 107, the cutters 11, 12, 13, 14, 15 and 16 are moved into cutting engagement with the being wound tube 17. Since the cutters 11, 12, 13, 14, 15 and 16 are equally spaced apart along the bar 111 the engagement of the cutters with the being wound tube 17 will result in six container bodies being severed from the tube 17; a severed container body being illustrated in FIGURE 2 and indicated at 177.

In FIGURE 1 it will be seen that wires 178 and 179 connect the control circuit 150 with the servo motor 116. The control circuit 145 is similarly connected to the servo motor 118 by means of wires 181 and 182. The operation of the observing unit 114, control circuit 150, and servo motor 116, will best be understood by referring to FIGURE 7.

The generator 151 supplies power to an oscillator which develops a suitable A.C. excitation such as, for instance, 1000 c.p.s. The oscillator is indicated at 183; the power being supplied from the generator 151 through the wires 152, 153, 154 and 155. Wire 148 connects the oscillator with one of the contacts of the set of contacts 146. The other contact is connected by means of wire 147 via switch 186 to one lead of the primary winding 187 of a transformer 188. Wire 190 connects the oscillator to the other lead of the primary winding 187. Transformer 188 has two secondary windings indicated at 191 and 192 which are connected together by means of a wire 193. A transformer generally 194 has one winding thereof 195 connected to wires 148 and 190 by wires 196 and 197 respectively. The other winding 198 of transformer 194 is connected into a de-modulator 200 by wires 201 and 202. Wires 203 and 204 connect the de-modulator 200 with a D.C. amplifier 205. Wires 178 and 179 from the servo motor 116 also connect into the D.C. amplifier 205.

The observing unit 114, which is of the photo-electric type, has a light emitting unit 123, as previously explained, that is suitably energized, such as by the generator 206.

Light rays therefrom indicated at 207 are directed onto the being wound tube 17 so as to illuminate a small portion of a circumferential line 18. The photo-sensitive cell housing 124 is substantially light impervious and houses a pair of photo-cells 208 and 210. A lens 211 is used to focus the image of the illuminated portion of the tube 17 onto the photo-cells 208 and 210. A wire 212 connects photo-cell 210 to the winding 191 of transformer 188. A wire 213 connects photo-cell 208 to the winding 192 of transformer 188. Rectifying diodes 214 and 215 are provided in wires 212 and 213 respectively. Current limiting resistors 216 and 217 are also provided in wires 212 and 213 respectively. A wire 218 connects photo-cells 208 and 210 to one lead of a winding 219 of a transformer generally 221. A wire 222 connects wire 193 to the other lead of winding 219. The other winding 223 of transformer 221 connects into an A.C. amplifier 224 via wires 225 and 226. A.C. amplifier 224 is connected to the de-modulator 200 by means of wires 227 and 228.

It is to be understood that the observing units 112 and 114, the phase detecting and reversing relay network 158, and the control circuits 145 and 150, are fabricated entirely from conventional components in a known manner and no specific claims is made herein to any of the circuitry illustrated. Furthermore, it is to be understood that the control circuits 145 and 150 and the observing units 113 and 114 are respectively of similar construction and operation.

The cutter 11 of the array of cutters comprising cutters 11, 12, 13, 14, 15 and 16 is fixedly centered with respect to the optical axis of the lens 211 which is indicated at 230. Optical axis 230 is, in turn, centered with respect to the photo-cells 208 and 210.

The arrangement of the entire array of cutters when in position to be brought into engagement with the being wound tube 17 to sever the tube into a plurality of container lengths 177 is shown in FIGURE 6. In such a gang cutting operation it is desirable, that the end cutters 11 and 16 be brought into very accurate registration with respect to the adjacent circumferential lines 18 by means of the observing units 113 and 114 acting through the control circuits 145 and 150 respectively. The intermediate cutters 12, 13, 14 and 15 will be adjusted by the proportioning linkage 127 so as to divide the length of tube L between the cutters 11 and 16 into five equal lengths.

In order to better set forth the nature of the present invention it is at this time pointed out that the use of photoelectric observing units analogous to the observing units 113 and 114 for detecting a registration control feature on the being wound tube, or on the strip material before it is wound, is now well-known in the art and reference is made herein to U.S. Patent 2,623,443, issued to Ernest B. Robinson on December 30, 1952. This patent discloses apparatus for photo-electrically detecting anticipated discontinuities as they pass by a fixedly positioned detecting device which signals the need for an adjustment whenever a discontinuity, such as a circumferential ring around the being wound tube, gets out of time with its anticipated instant of arrival at the detecting device. By this means a main carriage, similar to carriage 10, together with the tube cutting knives is caused to be periodically re-positioned with respect to the being wound tube by a manually selectable amount.

In accordance with the presently disclosed apparatus, on the other hand, the photo-electric observing units 113 and 114 are mounted on the carriage 10 for back and forth movement therewith. This permits the observing units to actually track an adjacent circumferential line 18 provided at the end of each container length. During the tracking of a circumferential line, such as a line 18, the photo-electric observing units 113 and 114 cooperating with the control circuits 145 and 150 and the servo motors 116 and 118 will constantly operate to bring the cutters 11 and 16 into precise alignment with adjacent lines 18 during the constant velocity portion of the stroke of the carirage 10 in the direction of advance of the tube 17 until the cutters are brought into action to cut the tube.

To initiate the operation of the apparatus of FIGURE 1, the strips 19 and 21 are manually fed into the crossed belt 24 by the operator of the machine. When the strips are properly started the belt 24 is brought up to a desired speed by means of the adjusting handle 40 of the P.I.V. drive unit 30. The tube 17 being produced will begin moving to the left at the desired speed as adjusted. The carriage 10 will start traversing, and; the machine operator; by means of the adjusting handle 175 on the differential gear box 171 will adjust the position of the shaft 45 of P.I.V. drive unit 41 to synchronize the speed of the carriage 10 to that of the being wound tube 17 and position the cutters 11–16 in close registration with circumferential lines 18 during each right to left movement of the carriage 10. Once this adjustment has been made the operator will then close switch 186 as shown in FIGURE 7 to energize the control system 150. The control circuit 145, being similar to the control circuit 150, will likewise be energized by means of a switch similar to the switch 186.

The machine will now be automatically controlled as wil be best described by making reference to FIGURE 7 in particular. As illustrated the cutter 11 is in substantial alignment with a line 18, meaning that line 18 is nearly centered with respect to the optical axis 230 of the lens 211 since the cutter 11 is fixedly centered on the optical axis. The line 18 may be a narrow line in the order of .015" in width and may be a dark line on a light background or a light line on a dark background, as desired, or as necessary, depending upon the background color of the being wound tube 17. The illuminated area of the tube 17 containing the line 18 will be projected as an image by the lens 211 onto the photo-cells 208 and 210.

If, for example, the cutter 11 is perfectly aligned with a line 18, the image of the line 18 will be perfectly centered between the photo-cells; the photo-cells will be equally illuminated and their electrical resistances will be equal. Uni-directional pulse voltages are applied to the photo-cell 210 from the winding 191 of the transformer 188 through the rectifying diode 214 and current limiting resistance 216 via wire 212. At the same time uni-directional pulse voltages are applied to the photo-cell 208 from the winding 192 through rectifying diode 215 and current limiting resistance 217 via wire 213. These applied pulses are always equal in magnitude, of the same polarity, and are alternate in time. Since photo-cells 208 and 210 are now in a condition of equal resistance, pulses of equal magnitude are impressed on wire 218 through photo-cells 208 and 210. The pulses are impressed on the winding 219 of transformer 221, then are transformed and impressed on the winding 223 and delivered to A.C. amplifier 224 via the wires 225 and 226. The de-modulator 200 receives the signal pulses through wires 227 and 228. De-modulator 200 is energized at the same frequency as the oscillator 183 and transformer 221 through the transformer 194. Since the pulses being impressed on the de-modulator 200 are still equal in magnitude and of the same polarity; upon being de-modulated; there will be no net D.C. component for transmission through wires 203 and 204 to the D.C. amplifier 205 to energize the servo motor 116. The cutter 11 will thus remain aligned with the adjacent line 18.

As the centering of line 18 is initially seen by the observing unit 114, or as its tracking thereby continues, the line 18 may be, or tend to drift, either to the left or right of the optical axis 230. This may occur as a result of initial misalignment at the instant of energizing the control circuit by cam 140 and the contacts 146, or it may be due to the rate of movement of the tube and the cutter carriage 10 being slightly out of synchronization, or due to slight variances in the accuracy of the winding of the tube which may be brought about by slight changes in the thickness of the webs or strips 19 and 21, in the stretching of the strips, or by transient relative motions due to inertial surges arising in the machine or the strip feed system. Any such shifting of the line 18 will result in one or the other of the photo-cells 208 and 210 receiving a greater portion of the projected image of the line 18 thereon. This results in a decrease of the resistance of one of the photo-cells and a corresponding increase in the resistance of the other. In this situation the pulse pattern impressed on wire 218 will not be equal as before but will now consist of alternate large and small pulses. Once such pulses are impressed on the de-modulator 200 via the transformer 221 and the amplifier 224 the result upon de-modulation is that there will be a net D.C. component. This resulting net D.C. component when impressed on the D.C. amplifier 205 through wires 203 and 204 will result in the operation of the servo motor 116 by the amplified D.C. component being transmitted to the servo motor 116 through the wires 178 and 179.

At this time, it is pointed out that the servo motor 116 is sensitive to the polarity of the direct current supplied to it through wires 178 and 179 so as to rotate in one direction for one polarity of the direct current and in the opposite direction for the other polarity of the direct current.

The resulting operation of the motor 116 causes the shaft 117 to rotate resulting in the shifting of the frame 115 along the slide bar 111 and consequent movement of the cutter 11 and other components of the observing unit 114 in a direction to eliminate the variance in alignment between the line 18 and the optical axis 230 of the lens 211. As the correction process progresses the signal pulses in wire 218 will become closer and closer to being even in amplitude which results in less and less current being supplied to the motor 116 until, when substantially perfect alignment is achieved, the motor 116 will stop.

If the situation exists in which the line 18 is misaligned with the optical axis 230 but in the opposite direction of that just explained, the resistances of the photo-cells 208 and 210 will be reversely changed resulting in the signal pulses impressed in wire 218 still being alternately large and small in magnitude but in reverse order. That is to say the high pulses of the previous example will now be the low pulses and vice versa. When this type of signal is de-modulated by the de-modulator 200, there will result a net D.C. component of opposite polarity, which, when amplified and delivered to the motor 116 will cause it to run in the opposite direction. This results in the turning of the shaft 117 in the opposite direction and movement of the frame 115 along the slide bar 111 in the opposite direction until the error in alignment has been substantially reduced to zero.

In order to prevent the observing unit 114 from trying to track a circumferential line 18 during the return stroke of the carriage 10 from left to right, the cam 140 is contoured to keep the contacts 146 open during the return stroke. The contacts 146 will be closed to energize the control circuit 150 shortly after the carriage 10 has been brought up to a constant speed during its right to left stroke. The contacts will remain closed during the tracking portion of the stroke of the carriage 10 until the cutters are brought into contact with the tube, after which they will be opened for the return stroke. The cam 141 and contacts 142 serve exactly the same purpose with respect to the control circuit 145 and the observing unit 113.

During normal operation of the machine 9 it will be appreciated that many corrections will be made over a period of time. If the sum of the corrections in one direction and the sum of the corrections in the opposite direction are equal, then the geometric center of the cutter array will remain substantially centered with respect to the slide bar 111. This situation rarely, if ever, occurs, it being most usual for corrections in one direction to occur more frequently than corrections in the other direction. This results in the cutter array being gradually shifted in one direction with respect to the slide bar 111 and the carriage 10 such that if the trend is not corrected the cutter aray will eventually reach the end of the allowable travel space. Since it takes quite some time for such a trend of movement to develop it is possible for the operator of the machine to make periodic corrections to the P.I.V. drive unit 41 in the absence of the automatic control effected by the reversible motor 167 through the differential gear box 171.

However, with my automatic control system in operation the cutter array is automatically maintained within a safe travel limit with respect to the carriage 10. If, for instance, the trend of corrections causes the cutter array to move to the left, eventually the L-shaped arm 134 will shift the operating rod 136 of the variable differential transformer 137 to the extent that a voltage of one phase and of sufficient magnitude will be developed in one of the secondary windings of the differential transformer to activate the phase detecting and reversing relay network 158 to cause the reversible motor 167 to begin rotating in the proper direction to cause the shaft 45 to rotate counter-clockwise which results in the speeding up of the output shaft 44 of the P.I.V. drive unit 41. The motor 167 is caused to turn a predetermined number of revolutions by virtue of a time delay mechanism being incorporated in the network 158.

On the other hand, if the trend of corrections causes the shifting of the cutter array to the right the operating rod 136 of the differential transformer 137 will be shifted to the right by the L-shaped arm 134 which will cause a signal voltage to be developed in the other of its two secondary windings. This output voltage will be of opposite phase and when it becomes large enough in magnitude due to further movement of the operating rod 136 to the right, it will cause the activation of the phase detecting and reversing relay network 158 which, in turn, will cause the reversible motor 167 to rotate in the opposite direction a like number of turns. This will cause the shaft 45 to be rotated clockwise resulting in the output shaft 44 of the P.I.V. drive unit 41 to be slowed down. The correction made to the shaft 45 in each case will be of such magnitude so as to cause the trend of movement of the cutter array to be reversed in direction. This results in the cutter array being caused to float back and forth between preset limits determined by the characteristics of the linear variable differential transformer 137 and the phase detecting and reversing relay network 158.

Prior to the concept of the present invention, it was the general practice to have the cutters in the cutter array fixedly spaced apart a distance equal to the desired length of the containers to be cut from the being wound tube. As best shown in FIGURE 5 a single observing unit 231 was provided for observing an appropriate one of the registration lines 18. In accordance with this prior practice the left hand cutter 232 in the cutter array generally indicated at 233 had to trim off a waste ring defined by the end of the being wound tube 17 which is indicated at 234 and the dotted line 235 which will be the line of cut made by the cutter 232. In order to understand why it was necessary to always cut off the waste ring each time the cutter array 233 was brought into cutting engagement with being wound tube 17 consider what would happen if it were attempted to have the end of the being wound tube 234 accurately positioned so that it would be in the same plane as the dotted line of cut 235. If it were possible to so accurately line up the end 234 with the line of cut 235 it is to be realized that there would be no need for the end cutter 232. However, due to slight variations in the thickness of the being wound strip material, variations in the stretch characteristics of the strip material, and slight winding errors; errors due to inertial surges in the machinery and errors that may occur due to unknown reasons, it was impossible to accurately locate the end 234 in the plane of the line 235 with such accuracy that the end cutter 232 would not be necessary. There would be times when the end 234 would be short of reaching the plane of the cutter 232 such that when the array of cutters 233 would be brought against the being wound tube the cutter 232 would not cut a waste ring and the leading container would therefore be shorter than normal. If the leading container was short beyond an allowable tolerance which would often be the case, it would be defective and would have to be destroyed. In order to prevent the production of such defective containers that would have to be destroyed the tube was wound consistently beyond the cut line 235 as illustrated and a sacrificial waste ring of varying width was cut off during each commitment of the cutter array 233 against the being wound tube 17. Although this waste ring was of very narrow width it is to be appreciated that when billions of container bodies such as the container body 177 are manufactured yearly the material in the waste ring became economically significant to the extent that a considerable monetary saving could be achieved if it were possible to eliminate the need for such a waste ring.

Furthermore, in accordance with the prior art practice of FIGURE 5, it will be noticed that only one cutter 236 is in alignment with a circumferential registration line 18. The reason for this is because what is known as "parcelled-out planned trim" has been incorporated into the pattern or label sections defined between the lines 18, When parcelled out planned trim is used, the spacing between the lines 18 will be slightly longer than the container length. Thus the cutters to the right and to the left of the cutter 236 will deviate from being in perfect alignment with an adjacent line 18 in progressive amount with the outermost cutters in the array having the greatest deviation. As will be seen, the patterns or labels 20 will not be perfectly centered with respect to a container but will be either higher or lower than center when considering the container body standing on one of its ends. This off center condition of the labels 20 is normally small in magnitude and not noticeable to the casual observer. However, in accordance with the present invention the labels 20 will always be substantially perfectly centered on the containers and this allows a little more latitude in label design. If the labels are substantially centered it is possible for instance to include printed information close to the container ends without fear that the printed information will be hidden in the seams formed when ends are applied to the container bodies. Although a full understanding of the practice of providing the parcelled-out planned trim in the pattern bearing strip is not necessary for the understanding of the operation of the present invention reference to made to U.S. Patent 2,737,091 to Ernest B. Robinson, which issued on March 6, 1956, for those who are interested in a comprehensive explanation of parcelled-out planned trim technique.

In accordance with the present invention since parcelled-out planned trim is not necessary the lines 18 are printed on the outer label bearing strip 19 so that when the strip is wound on the being formed tube 17 the distance between the lines 18 will be more nearly that corresponding to the desired length of the containers to be cut. Variations will occur, however, and they will tend to accumulate; such as to cause the length L (FIGURE 6) to vary during the operation of the machine 9. As L varies, the position of the cutters 12, 13, 14 and 15 will be adjusted by the proportioning linkage 127 so that the five container bodies that will be formed between the cutters 11 and 16 upon the commitment of the cutters against the being wound tube illustrated in FIGURES 2 and 6, will all be equal in length, although they may be slightly longer or shorter than the desired length in accordance with whether L is longer or shorter than the desired length. In addition to the five container bodies that will be produced between the cutters 11 and 16, an additional container body will be formed to the left of the cutter 11.

As an illustrative example as to how the invention operates to achieve the desired ends, consider that the desired length of the containers to be cut in FIGURES 2 and 6 is 6". This would mean that L would be desirably 30". For 6" containers an allowable tolerance in length would be plus or minus .005". This gives an allowable tolerance for the length L of plus or minus .025". The accuracy of winding the tube 17 is such that despite the aforementioned reasons that perfect winding of the tube is rarely achieved, the length L of 30" plus or minus the tolerance of .025" can be consistently achieved on a carefully made and adjusted machine. All of the containers produced will therefore be within the allowable tolerance and there will be no waste material.

A still further advantage is achieved by using the practice of the present invention as opposed to the prior practice of FIGURE 5. In FIGURE 5 it is to be noted that the cutter 232 has to cut very close to the end 234 which can result in an unclean cut being made and the riding out of the cutter over the end 234 on occasion instead of making a cut. In order to avoid ragged and slivering cuts by the cutter 232, or overriding of the end 234, it is desirable to provide enough excess length of material to the left of the cutter 232 to insure a clean cut by the cutter 232. This additional material, of course, increases the width of the waste ring defined by the end 234 and the line of cut 235. As will be noted in FIGURE 2, the end cutter 11 has a full container length of tube to the left thereof so that there is no possibility of this cutter making a slivering cut or riding out beyond the desired line of cut.

Although only a preferred embodiment of the invention has been illustrated and described herein, it is to be understood that obvious modifications will become apparent to one skilled in the art. For instance, it will be understood that the circumferential lines 18 need not be optically visible as described above and their position relative to a reference point need not be observed by the photo-electric means described. Line 18 can be more readily defined as any quantitatively detectable linear discontinuity previously applied or imposed on the label material in a fixed dimensional relationship thereto in such a way as to be disposed circumferentially on the tube after winding. Similarly the definition of the observing means 113 and 114 can be broadly interpreted as any means capable of providing a continuous signal which can be quantitatively correlated to the nearness and directional disposition of the above described discontinuity with respect to a point fixed in relation to the observing means. Some examples falling within the above broad definitions would be:

(1) A line composed of magnetic material combined with a spaced pair of magnetic proximity detectors;

(2) A "gray scaled" or half-toned line of magnetic material combined with a single magnetic proximity detector;

(3) A chemical line photo-electrically detectable only under ultra-violet, infra-red, or X-ray excitation;

(4) A line of material applied to the opposite side of the label foil laminate and detectable by ultra-sonic echo matching; and, (5) A physical discontinuity in the label foil such as a removed or added strip; a raised line, or a depressed line, combined with a pair of spaced and null-balanced eddy-current proximity detectors.

Many other combinations of discontinuities with appropriate detecting means falling within the above broad definitions would be within the scope of the invention.

For instance in FIG. 8 is illustrated in combination wherein a forward observing unit 250 observes and tracks the line of the cut end 251 of a tube 17; the forward observing unit being of the photo-electric type. A rear observing unit 252 includes a pair of spaced magnetic proximity detectors. The lines 18 are printed on the tube outer surface with a magnetic ink of the same color as the tube in between the patterns 20 so that they are not visible to the naked eye. Furthermore, all of the cutters are carried by the proportioning linkage 253. That is to say, there are no cutters, such as the cutters 11 and 16, that are directly associated with the observing means 250 and 252.

Similarly, the means described for moving the cutter array should be considered as illustrative and not restrictive. Any appropriate linear transducer could be used in place of the servo motors 116 and 118 and the respective associated screws 117 and 120. In certain circumstances where fast response would be desirable the described linear motion means could be replaced by a hydraulic cylinder and a suitable electro-hydraulic servo-valve without changing the intent or function of the motion system.

Also, the number of cutters used in the cutter array may be greater or lesser than illustrated, depending on the size of the machine, length of the containers desired, production rate, and other factors.

The scope of my invention is therefore not intended to be limited to the apparatus shown but rather as set forth in the following claims.

I claim:

1. A machine for the production of spirally wound tubular bodies from strip material including: means for winding strip material on a mandrel to form a tube having periodically recurring circumferential registration lines thereon, and for moving the tube axially along the mandrel; cutting means positioned adjacent the being formed tube for severing tubular bodies therefrom; and means for moving the cutting means cyclically back and forth parallel to the axis of the mandrel; said cutting means including a first cutter mounted for movement with a first observing means for observing a first registration line during a portion of the cyclical movement of the cutting means in which the tube and cutting means are moving in the same direction and at substantially the same speed; said cutting means including a second cutter mounted for movement with a second observing means for observing a second registration line during the same interval that the first registration line is being observed; first adjusting means independent of the means for cyclically moving the cutting means, being able to continuously adjust the position of the first observing means and first cutter with respect to the being wound tube during the said portion of the cyclical movement of the cutting means; first control means continuously responsive to a deviation of the first said registration line from a desired position with respect to the said first observing means, said first control means being operatively associated with the said first adjusting means so as to continuously cause to be minimized any such said deviation that may be present prior to the severing of the tube by the first cutter; second adjusting means independent of the means for cyclically moving the cutting means, being able to continuously adjust the position of the second observing means and second cutter with respect to the being wound tube during the said portion of the cyclical movement of the cutting means; second control means continuously responsive to a deviation of the second registration line from a desired position with respect to the said second observing means, said second control means being operatively associated with the said second adjusting means so as to continuously cause to be minimized any such said deviation that may be present prior to the severing of the tube by the second cutter; said second observing means being spaced from the first observing means in a direction opposite the direction of advance of the being wound tube; a third cutter disposed intermediate the said first and second cutters, said third cutter being adjustably movable back and forth parallel with respect to the being wound tube and proportioning means associated with the first, second and third cutters operative to maintain the third cutter in a pre-set proportional spaced relationship between the first and second cutters as they are shifted by the first and second adjusting means.

2. Claim 1 in which the first and second adjusting means each includes an electric servo motor operable to continuously adjust the position of its associated observing means.

3. Claim 1 in which a detecting means is positioned adjacent the proportioning means for operation by movement of the proportioning means; said detecting means being operatively associated with a speed adjusting means for changing the speed of the means for moving the cutting means cyclically back and forth.

4. A machine for the production of spirally wound tubular bodies from strip material including: means for winding strip material on a mandrel to form a tube having detectable circumferential registration features thereon, and for moving the tube axially along the mandrel; cutting means positioned adjacent the being formed tube for severing tubular bodies therefrom; and means for moving the cutting means cyclically back and forth parallel to the axis of the mandrel; said cutting means including a first observing means for observing a first circumferential registration feature during a portion of the cyclical movement of the cutting means in which the tube and cutting means are moving in the same direction and at substantially the same speed; said cutting means including a second observing means for observing a second circumferential registration feature during the same interval that the first circumferential registration feature is being observed; first adjusting means independent of the means for cyclically moving the cutting means, being able to continuously adjust the position of the first observing means with respect to the being wound tube during the said portion of the cyclical movement of the cutting means; first control means continuously responsive to a deviation of the first circumferential registration feature from a desired position with respect to the first observing means, said first control means being operatively associated with said first adjusting means so as to continuously cause to be minimized any such deviation that may be present; second adjusting means independent of the means for cyclically moving the cutting means, being able to continuously adjust the position of the second observing means with respect to the being wound tube during the said portion of the cyclical movement of the cutting means; second control means continuously responsive to a deviation of the second circumferential registration feature from a desired position with respect to the said second observing means, said second control means being operatively associated with the said second adjusting means so as to continuously cause to be minimized any such said deviation that may be present, said second observing means being spaced from the first observing means in a direction opposite the direction of advance of the being wound tube; a proportioning means associated with the first and second observing means for operation by the first and second adjusting means; said proportioning means being operatively associated with a plurality of cutters disposed in a pre-set proportional spaced relationship with respect to the spacing between the first and second observing means and being capable of continuously maintaining the said pre-set proportional spaced relationship while the positions of the observing means are being changed by their respective adjusting means.

5. A method of severing tubular lengths from a being formed tube having spaced apart circumferential registration lines thereon which comprises: advancing the being formed tube in the direction of its longitudinal axis; moving a first cutter adjacent the being formed tube in the direction of advance of the tube and at substantially the speed of advance of the tube; adjusting the position of the first cutter as it is being advanced to bring it into alignment with a first circumferential registration line on the tube; simultaneously moving a second cutter adjacent the being formed tube in the direction of advance of the tube and at substantially the speed of advance of the tube; adjusting the position of the second cutter as it is being advanced to bring it into alignment with a second circumferential registration line on the tube which is spaced from the first circumferential registration line in a direction opposite to the direction of advance of the tube; simultaneously moving a third cutter adjacent the being formed tube in the direction of advance of and at substantially the same speed as the being formed tube; adjusting the position of the third cutter, as it is being advanced, with respect to the first and second cutters, in accordance with the adjustments being made to the first and second cutters, to maintain the third cutter in a desired proportional spaced relationship with respect to the first and second cutters; and then bringing all of the cutters into cutting engagement with the being formed tube to sever the tube into proportional lengths.

6. The method of claim 5 in which the third cutter is moved between the first and second cutters.

7. A method of severing tubular lengths from a being formed tube having spaced apart circumferential registration lines thereon which comprises: advancing the being formed tube in the direction of its longitudinal axis; moving a first cutter adjacent the being formed tube in the direction of advance of the tube and at substantially the speed of advance of the tube; adjusting the position of the first cutter as it is being advanced to bring it into alignment with a first circumferential registration line on the tube; simultaneously moving a second cutter adjacent the being formed tube in the direction of advance of the tube and at substantially the speed of advance of the tube, adjusting the position of the second cutter as it is being advanced to bring it into alignment with a second circumferential registration line on the tube which is spaced from the first circumferential registration line in a direction opposite to the direction of advance of the tube; simultaneously moving a group of cutters that is spaced between the first and second cutters adjacent the being formed tube in the direction of advance of and at substantially the same speed as the being formed tube; adjusting the positions of the individual cutters of the said group of cutters with respect to the first and second cutters as the group of cutters is being advanced, in accordance with the adjustments being made to the first and second cutters to maintain the individual cutters of the said group of cutters in a desired proportional spaced relationship with respect to the first and second cutters and then bringing all of the cutters into cutting engagement with the being formed tube to sever the tube into proportional lengths.

No references cited.